May 21, 1929.  W. DUBILIER  1,713,867
ELECTRICAL CONDENSER
Filed March 1, 1924  2 Sheets-Sheet 1
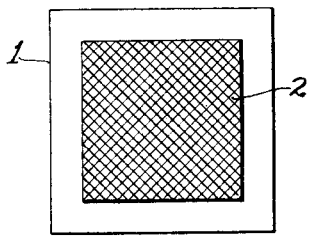
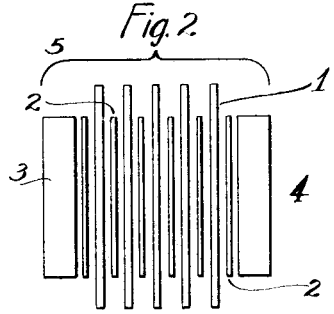
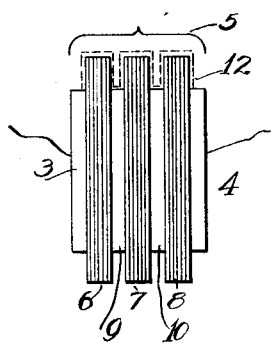
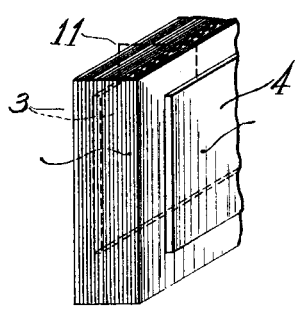
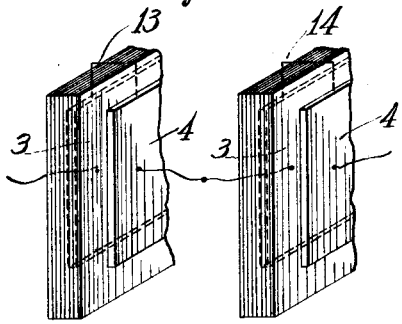
INVENTOR
William Dubilier
BY
H R Van Deventer
his ATTORNEY May 21, 1929.     W. DUBILIER     1,713,867
ELECTRICAL CONDENSER
Filed March 1, 1924     2 Sheets-Sheet 2
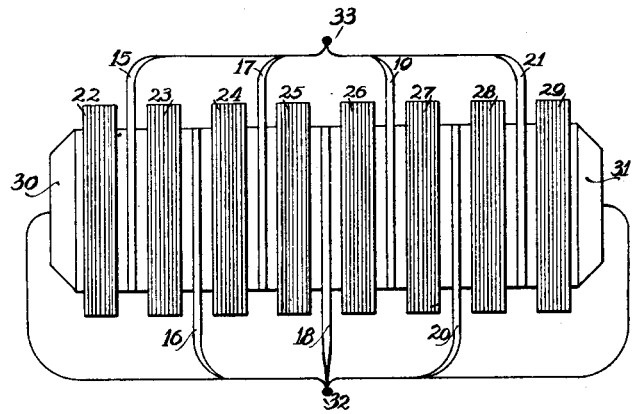
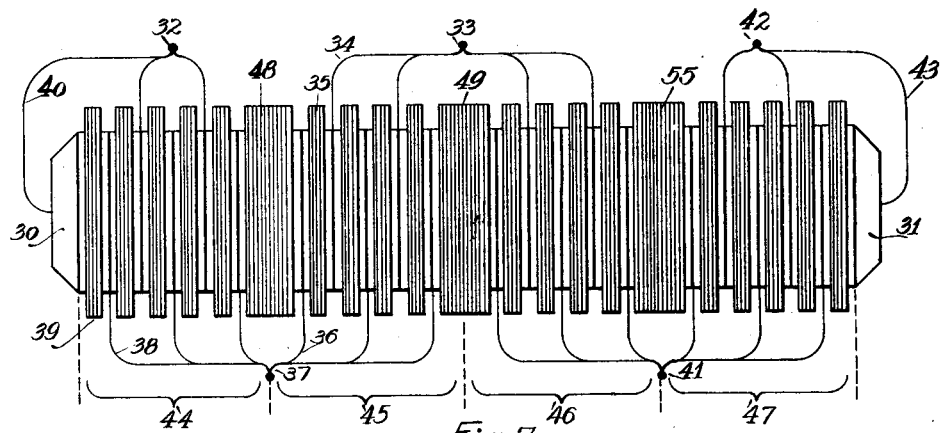
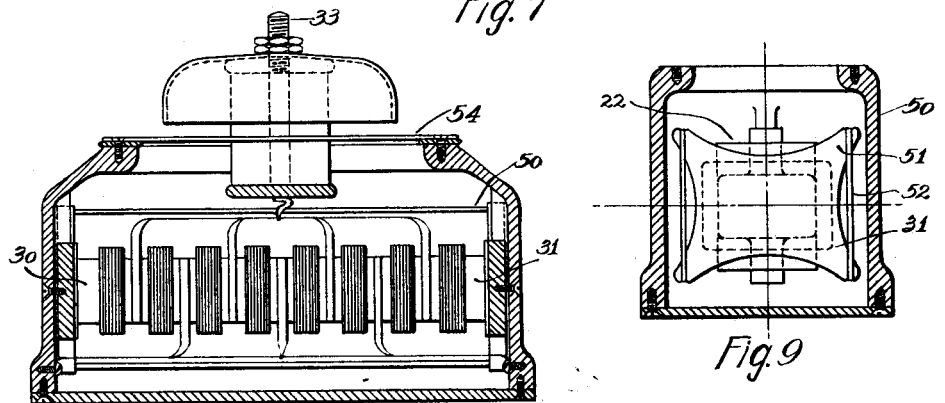
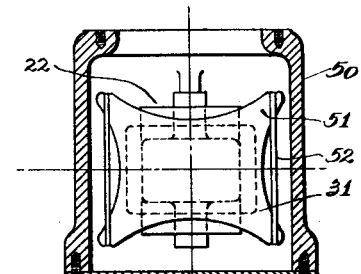
INVENTOR
William Dubilier
BY
H. R. Van Deventer
his ATTORNEY Patented May 21, 1929.

1,713,867

UNITED STATES PATENT OFFICE.

WILLIAM DUBILIER, OF NEW YORK, N. Y., ASSIGNOR TO DUBILIER CONDENSER CORPORATION, A CORPORATION OF DELAWARE.

ELECTRICAL CONDENSER.

Application filed March 1, 1924. Serial No. 696,185.

My invention relates to electrical condensers and has for its object to provide an electrical condenser involving the use of a minimum amount of dielectric material so arranged and disposed in connection with conducting plates, as to produce a simple structure capable of use in high potential high frequency circuits where it is important to employ a condenser having minimum losses and with brush discharges eliminated.

Another object is to provide a condenser in which heating of the condenser unit and its associated circuit terminal and casing is eliminated as much as possible.

Another objects is to provide a condenser having some of its parts so constructed and arranged that the electrical current flowing therethrough will follow a path substantially at right angles to the plane of many of the conducting plates therein, whereby the electrical resistance of the condenser is greatly reduced.

Further objects and advantages of the invention will be in part obvious and in part specifically pointed out in the following description which, taken in connection with the accompanying drawings discloses a preferred embodiment thereof. Such embodiment, however, is to be considered merely illustrative of its principle.

The underlying electrical principles of the present invention are the same as those set forth in my copending application Serial No. 472,105, filed May 24, 1921, this case now having matured into Patent No. 1,575,044, granted March 2nd, 1926, wherein is disclosed a condenser consisting of alternate layers of mica and metal foil, the intermediate layers of foil being isolated one from another by the adjacent sheets of mica. By such a construction there is produced a condenser capable of withstanding high potential in which the tendency toward so-called "brush discharge" or "corona effect" is greatly reduced. The brush discharge or corona effect is that discharge which occurs as a result of conduction along the surfaces and thence across the edges of the sheets of dielectric and is, in effect, a high resistance leakage. The path across which this leakage occurs, I term the "creepage path".

The breakdown voltage of a condenser, is, in general, not directly proportional to the thickness of the dielectric for any given dielectric material. For example, an ordinary condenser comprising alternate layers of metal foil, and mica of a certain thickness may be entirely satisfactory and may show no appreciable brush discharge with an impressed potential of 1000 volts. By doubling the thickness of the layers of mica the condenser may be capable of withstanding 2000 volts, but in the latter instance an appreciable brush discharge might occur. Likewise by tripling and quadrupling the thickness of the mica the breakdown voltage may be increased, but in each succeeding case the probability of brush discharge is rapidly increasing. By the provision of intermediate isolated or what may be termed "floating" metallic plates, the total impressed potential is divided between the several plates so that the potential across any one layer of dielectric is only a fraction of the total. It has been conclusively established by experiment that the brush discharge is thus greatly decreased without any increase in the amount of dielectric material required for a given capacity and potential, as compared with condensers heretofore known. Another important advantage inherent in this type of condenser arises from the fact that the flow of current therein is transverse to the plane of the metallic plates instead of parallel therewith, as in the former type of high potential condensers, which consisted of a plurality of serially connected condenser units. The effective ohmic resistance of the condenser plates is therefore greatly reduced without increasing their thickness, and the heating effect is in consequence correspondingly small.

To more clearly point out the difference between my present invention and the prior art I will illustrate the latter by reference to my U. S. Patent No. 1,229,915 dated June 12, 1917, which shows a type of high tension power condenser used in practically all commercial installations, particularly in the radio field, throughout the world. In this construction sections are employed, each section made up of a plurality of conducting plates or sheets connected in parallel and several such sections connected in series. The number of sheets per section and the number of sections arranged in series will depend upon the desired electrostatic capacity and the applied voltage. In this method of construction the total resistance of the condenser is equal to the sum of the resistances of the sections: this may be objectionable. Furthermore, a complicated system of soldering the conducting sheets of each section together and of soldering the various sections in series, is necessary and a further disadvantage is the difficulty in adjusting the total capacity of the condenser.

My present invention eliminates many of the difficulties of the foregoing construction, particularly the excessive ohmic resistance of the plates in the sections, and consists of making up the complete condenser of sections, each one of which consists of many independent conducting sheets and the necessary dielectric and then connecting these sections in parallel. It should be noted that in the condensers of the prior art the sections contained conducting sheets connected in parallel, and that the sections were connected in series, but that with the present invention this procedure is reversed.

Where desirable to meet certain working conditions, I may construct a condenser in accordance with the present invention by arranging a plurality of sections in series, (each section having a plurality of independently conducting plates) in groups of sections and then arranging these groups of sections in parallel. This arrangement increases the creepage distance as hereinafter described.

With condensers of the prior art I have found from practice that if two condensers are made up of different electrostatic capacities but employing the same materials throughout, that the condenser of larger capacity will break down at a lower voltage than the one of smaller capacity, and I find from practice that with condensers constructed in accordance with the present invention that this defect is largely overcome.

In the accompanying drawings, which are largely diagrammatic, and in which some of the parts are widely separated for the sake of clarity, Figure 1 shows one of the dielectric plates having a conducting coating as used in the sections;

Figure 2 is a diagram of a complete section showing the arrangement of the dielectric plates therein having thereon conducting coatings, these coatings being hereinafter referred to as conducting plates or foils;

Figure 3 is a diagrammatic view of a section similar to that shown in Figure 2, but modified by the interposition of metallic plates or blocks;

Figure 4 is a diagram illustrating what I term "creepage distance" around the edges of one of the sections shown in Figure 2 or 3;

Figure 5 is a diagram showing two of sections, constructed as shown in Figure 2 or 3, arranged in series for the purpose of increasing the creepage distance;

Figure 6 is a diagram showing eight sections, Figure 2, assembled to form a complete condenser unit;

Figure 7 is a diagram showing a plurality of complete sections of the type shown in Figure 2 or 3, arranged in series multiple between the main terminals of the condenser;

Figure 8 is a sectional side view of a complete condenser constructed in accordance with my invention, and Figure 9 is a view partly in cross-section of the condenser shown in Figure 8.

For the sake of illustration I will first describe a section for a condenser as commonly employed in connection with radio apparatus and particularly adapted to transmitting sets. In such sections mica is employed usually for the dielectric sheets and mica sheets 1 of suitable thickness and about 2" square may be employed.

The mica sheets have secured to them upon one or both sides a metallic coating 2. This may be applied in any suitable manner and foil of suitable thickness is often used. A margin or free border about 1/4 of an inch wide may be left all around the foil, as shown in Figure 1.

A plurality of sheets of mica, for instance 20 sheets, containing the conducting plates or foils are assembled under heavy pressure to form a "section" shown (with the parts widely separated) in Figure 2, in which heavy lines, one of which is indicated by the numeral 1, represent the mica sheets and 2 the conducting sheets or foils. After these plates have been assembled, end blocks 3 and 4 of metal may be placed against the section. These end blocks form the electrical terminals for the section and serve to mechanically strengthen the same, besides serving to radiate heat from the section.

For the purposes of this description I desire that the word "section" be understood to embrace the complete group of foil and mica plates together with the blocks 3 and 4, as shown in Figure 2, where I have designated the complete section by the numeral 5.

In Figure 3 I show a modified form of section. Here the total number of mica and foil sheets are divided into two or more groups, 6, 7 and 8 and interposed between these are the metal blocks 9 and 10 which, in addition to the metal blocks 3 and 4, constitute the complete unit. By this arrangement I increase the creepage distance across the unit from block 3 to block 4 for reasons that will hereinafter more fully appear. These separator members or blocks also serve to conduct heat away from the plates of the section.

The metal blocks 3 and 4 such as used at the sides of each section and the blocks 9 and 10 which may be used in the sections, are preferably of the same surface area as the plates 2. By having all of the conducting material in the condenser of substantially the same surface area I find the electrical strains are more evenly divided and the condenser units, when assembled and clamped, as hereinafter described, are better able to withstand the very great pressure that is applied to them.

It now becomes necessary to consider a very important factor in connection with these sections which is that I term the "creepage distance". It is obvious that if the condenser consisted of a single section as shown in Figure 4, (the main circuit being connected to the blocks 3 and 4) that in case the distance across the outer face of the insulation between the blocks is not sufficiently large, the current will jump around the edges of the section at some point from block to block, thus causing an arc or spark that would be objectionable. Actual sparking or arcing need not occur at this point to cause trouble in the condenser, it being sufficient that a path exists between the blocks across which creepage of the current can exist. I therefore term this path the "creepage distance" across the section.

The creepage distance or path will be across some certain point in the section. Theoretically, this will be the shortest distance across the outer surface of the sections between the blocks 3 and 4 and usually can not be determined without subjecting the sections to an actual electrical test. For the sake of illustration, it will be presumed that this creepage distance in the case of the section shown in Figure 4 is indicated by the dotted line 11 and that the length of this path may be taken as one-quarter inch on each side face of the section and one-tenth inch across the top thereof, making a total of .6".

It will now be seen that I can materially increase this creepage distance by interposing the metallic blocks 9 and 10 in the unit as shown in Figure 3 where the creepage distance is indicated by the dotted line 12. Here, the creepage distance is over six of the quarter inch faces on each side of the groups of mica sheets and across the tops of the same. The groups of mica sheets and foils in this type of section would each be about 1/30 of an inch wide so that the section, Figure 3, would have a total creepage distance of 1½".

A further method of increasing the creepage distance is shown in Figure 5. Here two of the sections are placed in series when making up the complete condenser, and the creepage path may then be indicated by the dotted lines 13 and 14. Supposing for the sake of illustration that the section, Figure 4 is divided into two sections as shown in Figure 5, then while the distance across the top of the sections remains the same as it was across the single section of Figure 4, the total creepage distance from the plate 3 on the left hand section, Figure 5, to the plate 4 on the right hand section, Figure 5, is increased by one-half inch.

It should be remembered that the creepage distance in condensers in the prior art is along a path across all of the condenser sections in series between the main terminals, (where the sections are arranged in series and the conducting plates of each section are in parallel), whereas in the present invention the creepage distance may be across a single section and is therefore relatively short. Hence the necessity of increasing the creepage distance of each section as much as possible.

The creepage distance in some cases may be proportioned in respect to the potential to be applied to the section, and the thickness of the dielectric used therein. In some circuits, if the creepage distance exceeds the puncture point of the dielectric, then the section may be punctured and ruined without any flash-over occurring. I therefore calculate for a given case, the necessary free margin of the dielectric about the plates, and so proportion the creepage path to the voltage across the section, that the creepage path may act as a safety spark gap and prevent damage to the section.

Having described the construction of the sections, I shall now describe a complete condenser made up of a plurality of sections.

I shall first describe a condenser in which each section is in series with the main circuit terminals, a number of the sections being arranged in parallel to form the complete condenser. The sections are arranged as shown in Figure 6, a number of flexible conducting strips or section terminals 15, 16, 17, 18, 19, 20 and 21 being interposed between the sections and serving to conduct current thereto. These section terminals are also designed to act as heat radiating means and conduct heat away from the sections. The sections indicated by the numerals 22 to 29 inclusive are assembled between a metallic clamp, the ends of which are indicated at 30 and 31 and this clamp holds the sections together under heavy pressure. This clamp is usually connected to the metal casing of the condenser which may have mounted upon it the main circuit terminal 32.

It will be observed that terminal 32 is connected through the clamp to one side of sections 22 and 29, the end sections of the group, and that section terminals 16, 18 and 20 are also connected to this same terminal.

A main circuit terminal 33 is insulated from the casing, and to this terminal the section terminals 15, 17, 19 and 21 are connected. It will now be observed that each section of the group forming the complete condenser is in series with main terminals 32 and 33 and that all of the sections are in parallel.

In Figure 7 I have shown another arrangement illustrating that two or more of the individual sections may be placed in series with each other and arranged in groups, the groups being connected in parallel. For clearness, I have only numbered some of the sections, the arrangement of the unnumbered sections being obvious from the drawing.

Starting from the main circuit terminal 33 the incoming circuit will traverse conductor 34 and will pass through section 35 to conductor 36 to a junction 37 to conductor 38, through section 39 to one end of the clamp 30 and by way of conductor 40 to the main circuit terminal 32. Sections 35 and 39 will be in series as shown in Figure 5. It will be understood that if desirable these individual sections may be of the type shown in Figure 3, having interposed metallic blocks 9 and 10.

A study of Figure 7 will show the circuit connections through all of the other sections forming the complete condenser, it being understood that the junctions 37, 41 and 42 are not main circuit terminals but are merely points to which the various section terminals, such as 15, are connected, and the conductors 40 and 43 are usually portions of the metal casing connecting to the metallic clamp the jaws of which are shown at 30 and 31.

It will be observed that the condenser, Figure 7, contains four groups of sections, each group being included between the brackets 44, 45, 46 and 47, and that between each of these groups of sections may be interposed the insulating barriers 48, 49 and 55 insulating the groups of sections from each other.

It will be noted that in relation to main terminals 32 and 33, all of the sections in group 44 are in series with the sections in group 45 and the sections in group 46 are in series with the sections in group 47.

The complete condenser Figure 6 or 7 or any other arrangement of sections that may be desirable, may be mounted in a suitable casing 50. As the complete condenser usually forms a complete unit with its clamp, the latter may be used to mount the condenser in the casing, being secured to the latter in any suitable manner.

The clamp is preferably made so it will hold the sections under spring tension to allow for contraction and expansion. This is accomplished by making the end portions 51 of spring metal suitably shaped, and binding these in restrained position by means of piano wire 52 or in any suitable manner.

The main terminal 33 may be of any suitable character suitably insulated from the casing. The casing is provided with a suitable bottom 53, and a top 54, which makes it wax or oil tight.

The casing is usually filled with suitable insulating compound which completely surrounds all parts of the condenser sections, filling any minute spaces around the outer edges of the mica sheets comprising the condenser sections.

As the construction of the casing and terminals do not constitute part of the present invention, I will not describe them in detail.

I claim:—

1. The combination, with two or more condenser sections of members for spacing the sections apart and a flexible metallic member interposed between the sections for the purpose of conducting current thereto and radiating heat therefrom, the spacing members being conductive and isolated.

2. A condenser, wherein the dielectric and conductive sheets are divided into groups by interposed conductive blocks of greater thickness than the conducting sheets and of smaller area than the dielectric sheets.

3. A condenser comprising a plurality of sections, separator members between the sections, and terminals extending between adjacent sections, said sections being clamped under heavy pressure, said members being conductive and isolated.

4. A condenser and casing having circuit terminals and a plurality of sections, the terminals extending between adjacent sections, each of said sections being in parallel with said terminals and disposed within said casing, and separator members also between adjacent sections, said members being conductive and isolated.

5. A condenser and casing having circuit terminals, a plurality of sections, the terminals extending between adjacent sections, some of said sections being in series with each other and said terminals, and all said sections being disposed within said casing, and separator members also between adjacent sections, said members being conductive and isolated.

6. A condenser and casing having a main terminal, a plurality of condenser sections having terminals and arranged in said casing side by side to form a single group, separator members between the sections, a connection from the center of said group and from the ends thereof to said terminal, a second main terminal carried by said casing but insulated therefrom, and a plurality of connections from the remaining section terminals to said insulated main terminal, said members being conductive and isolated.

7. A condenser comprising three or more sections, separator members between adjacent sections, a clamp for compressing said sections, and a common terminal connected to more than one point in the sections, said members being conductive and isolated.

8. A condenser comprising three or more sections, separator members between adjacent sections, each section having a plurality of isolated conducting plates, a terminal for the condenser and a plurality of connections between said terminal and said sections.

9. A condenser comprising a plurality of sections clamped under compression, separator members between adjacent sections, each section comprising a plurality of insulating sheets and conducting plates in intimate contact, and a plurality of connections from said sections to a common terminal carried by the condenser.

10. A condenser consisting of a plurality of sections, separator members between adjacent sections, each section having a plurality of dielectric sheets and isolated conducting plates held in intimate contact with each other under compression and terminals projecting from said sections in opposite directions from the sides thereof.

11. In a condenser, a casing, a terminal mounted thereon and insulated therefrom, a clamp, a plurality of condenser sections held in said clamp within said casing, and separator members between adjacent sections, some of said sections being connected to the clamp and the remaining sections in circuit with said terminal.

12. In a condenser, a casing, a terminal mounted thereon and insulated therefrom, a plurality of condenser sections, separator members between adjacent sections, a clamp for the sections whereby they are held under compression, connections from said terminal to some of said sections, and connections between the remaining sections and said casing.

In testimony whereof I affix my signature.

WILLIAM DUBILIER.